United States Patent
Herron et al.

(10) Patent No.: US 10,638,906 B2
(45) Date of Patent: May 5, 2020

(54) CONVERSION OF CLEANING ROBOT CAMERA IMAGES TO FLOORPLAN FOR USER INTERACTION

(71) Applicant: Neato Robotics, Inc., Newark, CA (US)

(72) Inventors: Matthew Allison Herron, Hayward, CA (US); Rachel Lucas, Hayward, CA (US); Charles Albert Pitzer, Fremont, CA (US); Griswald Brooks, Fremont, CA (US); Kingman Yee, San Jose, CA (US)

(73) Assignee: Neato Robotics, Inc., Newark, CA (US)

( * ) Notice: Subject to any disclaimer, the term of this patent is extended or adjusted under 35 U.S.C. 154(b) by 4 days.

(21) Appl. No.: 15/844,437

(22) Filed: Dec. 15, 2017

(65) Prior Publication Data
US 2019/0183310 A1    Jun. 20, 2019

(51) Int. Cl.
*A47L 11/40* (2006.01)
*H04N 5/247* (2006.01)
(Continued)

(52) U.S. Cl.
CPC ........ *A47L 11/4011* (2013.01); *G05D 1/0231* (2013.01); *G06T 5/006* (2013.01);
(Continued)

(58) Field of Classification Search
CPC .. A47L 11/4011; G05D 1/0231; H04N 5/247; H04N 5/2253; H04N 5/2351;
(Continued)

(56) References Cited

U.S. PATENT DOCUMENTS 5,999,866 A * 12/1999 Kelly ................... G05D 1/0246
                                                         318/587
8,855,914 B1   10/2014 Alexander et al.
(Continued)

FOREIGN PATENT DOCUMENTS

DE   102011000536 A1 *  8/2012  ............. G01C 21/30
WO   WO-2011144710 A1 * 11/2011  ........... G05D 1/0246

OTHER PUBLICATIONS

Sendrut et al., A Compact Robotic Head for Automatic Acquisition of Indoor Panoramic Images, Apr. 2017, 978-1-5090-4489, IEEE, pp. 791-796 (Year: 2017).*

(Continued)

*Primary Examiner* — Marnie A Matt
(74) *Attorney, Agent, or Firm* — Kilpatrick Townsend & Stockton LLP

(57) ABSTRACT

In one embodiment, a method is disclosed for a robot (e.g., cleaning robot) to produce a bird's eye view (planar) map by transforming from a robot camera view and stitching together images tagged by location. The planar map can then be presented on a user interface as a floorplan, showing the location of objects (such as rugs). A camera is mounted in the cleaning robot sufficiently high in the cleaning robot housing to provide an angled view downward at a floor. The camera's field of view is captured as an image, and a portion or segment of that image is cropped. The cropped segment is transformed from the camera perspective to a planar view (before or after cropping), and is combined with other images to form a map of a floorplan.

18 Claims, 13 Drawing Sheets

(51) Int. Cl.
*H04N 5/225* (2006.01)
*G06T 5/00* (2006.01)
*G06T 11/60* (2006.01)
*H04N 5/232* (2006.01)
*H04N 5/235* (2006.01)
*G06T 7/70* (2017.01)
*G05D 1/02* (2020.01)
*G01S 17/42* (2006.01)

(52) U.S. Cl.
CPC ............... *G06T 7/70* (2017.01); *G06T 11/60* (2013.01); *H04N 5/2253* (2013.01); *H04N 5/2256* (2013.01); *H04N 5/2257* (2013.01); *H04N 5/2351* (2013.01); *H04N 5/23293* (2013.01); *H04N 5/247* (2013.01); *G01S 17/42* (2013.01); *G06T 2207/10016* (2013.01); *G06T 2207/20132* (2013.01); *G06T 2207/30252* (2013.01)

(58) Field of Classification Search
CPC .... H04N 5/23293; H04N 5/2256; G06T 7/70; G06T 5/006; G06T 11/60; G06T 2207/10016; G06T 2207/20132; G06T 2207/30252; G06T 1/0007; G06T 2207/20068; G06T 7/97; G01S 17/42; G05B 2219/37555; G05B 2219/40411; G05B 2219/40609
USPC ........................................................ 348/114
See application file for complete search history.

(56) References Cited

U.S. PATENT DOCUMENTS

| | | | |
|---|---|---|---|
| 8,903,589 | B2 | 12/2014 | Sofman et al. |
| 8,996,172 | B2 | 3/2015 | Shah et al. |
| 9,014,848 | B2 | 4/2015 | Farlow et al. |
| 2004/0088080 | A1* | 5/2004 | Song ................... A47L 9/009 700/259 |
| 2004/0137911 | A1* | 7/2004 | Hull ................... H04L 67/18 455/456.1 |
| 2004/0202351 | A1* | 10/2004 | Park ................... G05D 1/0234 382/104 |
| 2005/0131581 | A1* | 6/2005 | Sabe ................... G06K 9/00201 700/245 |
| 2009/0096879 | A1* | 4/2009 | Motomura ............... G03B 5/00 348/208.6 |
| 2009/0118865 | A1* | 5/2009 | Egawa ................... B25J 19/023 700/259 |
| 2011/0285874 | A1* | 11/2011 | Showering ............. G06K 9/033 348/231.99 |
| 2013/0025085 | A1* | 1/2013 | Kim ....................... A47L 9/2805 15/319 |
| 2013/0314688 | A1* | 11/2013 | Likholyot ............... G01S 17/42 356/3.1 |
| 2013/0326839 | A1* | 12/2013 | Cho ....................... A47L 9/2805 15/319 |
| 2014/0058610 | A1* | 2/2014 | Sofman ................. G05D 1/0274 701/23 |
| 2014/0207282 | A1* | 7/2014 | Angle ................... H04W 4/029 700/257 |
| 2014/0247116 | A1* | 9/2014 | Davidson ............. G06Q 10/087 340/10.1 |
| 2014/0350839 | A1* | 11/2014 | Pack ...................... G01C 21/30 701/409 |
| 2017/0052033 | A1 | 2/2017 | Fong et al. |
| 2017/0203446 | A1* | 7/2017 | Dooley ................. B25J 19/023 |
| 2017/0353658 | A1* | 12/2017 | Colin ................. H04N 5/23238 |
| 2017/0366814 | A1* | 12/2017 | Adsumilli .......... H04N 5/23238 |
| 2018/0174299 | A1* | 6/2018 | Agrawal ................. G03B 5/00 348/208.6 |
| 2018/0361577 | A1* | 12/2018 | Williams ................. B25J 9/163 |
| 2019/0045992 | A1* | 2/2019 | Brede ................... G05D 1/0212 |

OTHER PUBLICATIONS

Jasiobedzki, Detecting Drivable Floor Regions, 1995, IEEE, pp. 264-270 (Year: 1995).*

Taylor, et al., Map Building using Cheap Digital Cameras, 2007, Digital Image Computing Techniques and Applications, pp. 130-136 (Year: 2007).*

Cobos et al., Integrating Visual Odometry and Dead-Reckoning for Robot Localization and Obstacle Detection, 2010 IEEE International Conference on Automation, Quality and Testing, Robotics (AQTR) (Year: 2010).*

Sendrut et al., A Compact Robotic Head for Automatic Acqusition of Indoor Panoramic Images, Apr. 2017, 978-1-5090-4489, IEEE, pp. 791-796 (Year: 2017).*

* cited by examiner

CONVERSION OF CLEANING ROBOT CAMERA IMAGES TO FLOORPLAN FOR USER INTERACTION

BACKGROUND OF THE INVENTION

The present disclosure relates generally to robotic cleaners, and in particular to generating floor maps.

Cleaning robots often include cameras for various purposes. The camera can capture images of an area to be cleaned, and show objects in that area. Collected image data can be used to create a map, using a SLAM (Simultaneous Location and Mapping) algorithm. With image data, a VSLAM (Visual SLAM using image sensors) localization method can be used. A camera can capture images of a ceiling and use those for navigation. The map can be created from stitching together images. iRobot Pub. No. 20170052033 describes such a visual SLAM method. Carnegie Mellon U.S. Pat. No. 5,999,866 describes determining location from unique aspects of the images, such as carpet patterns. iRobot Published Application No. 20170203446 shows floorplan and camera image capture of objects, and provides an indication on the floorplan of where objects are, with a link to the picture. iRobot U.S. Pat. No. 9,014,848 describes correcting distortion in a target layout map compared to a robot generated map.

Cleaning robot maps and floorplans are optimized for use by the robot to determine location and take other actions, not for use by humans. It would be desirable to have a map optimized for human user interaction to control a cleaning robot.

BRIEF SUMMARY OF THE INVENTION

In one embodiment, a robot (e.g., cleaning robot) produces a bird's eye view (planar) map by transforming from a robot camera view and stitching together images tagged by location. The planar map can then be presented on a user interface as a floorplan, showing the location of objects (such as rugs). A camera is mounted in the cleaning robot sufficiently high in the cleaning robot housing to provide an angled view downward at a floor. The camera's field of view is captured as an image, and a portion or segment of that image is cropped or masked. The cropped segment is transformed from the camera perspective to a planar view (before or after cropping), and is combined with other images to form a map of a floorplan.

In one embodiment, a lens (e.g., fish-eye lens) is used in front of the camera. Before (or after) transforming from the robot perspective view to the planar view, a distortion algorithm is applied to correct the image distortion due to the lens. The transformation from the robot perspective view to the planar view utilizes the known manufactured height of the camera off the floor and known downward angle of the camera to correlate an image pixel position with a planar floor position. The position relative to the robot is used as an offset to the robot's localized position. Any tilting of the robot is detected and used to correct to image pixel position or simply discard the image.

In one embodiment, the floorplan is displayed to a user on a smartphone or other display device. The user provides inputs on the floorplan to modify an operating characteristic of the robot. For example, the user may indicate areas where the robot should not go, areas that require more intensive cleaning, etc.

In one embodiment, segments are captured for an area that is the same size or larger than the minimum resolution of the floorplan to be generated. For example, an area of a few millimeters may correspond to a single pixel on a floorplan displayed on a smartphone, and thus finer resolution would be a waste of processing power. Similarly, a less expensive camera with only such required resolution can serve the purposes of the present invention. Overlapping segments are captured, allowing alignment adjustment by matching the overlapping portions. The same segment area can be captured multiple times at different distances in the camera's field of view, or from different passes over the same area. The image quality can be weighted, with a higher quality image replacing a lower quality one. Weighting factors include, for example, speed of the robot when the image was captured, vibration, angle (tilt), agreement with overlapping portions of other segments, closeness of the segment to the camera and illumination.

In one embodiment, the illumination of the image is determined, and variances in illumination of different segments are corrected. The illumination may vary due to variations in lighting in the environment, or due to variations in intensity in the camera field of view of lighting from a light on the cleaning robot.

DETAILED DESCRIPTION OF THE INVENTION

Overall Architecture

Figure 1:
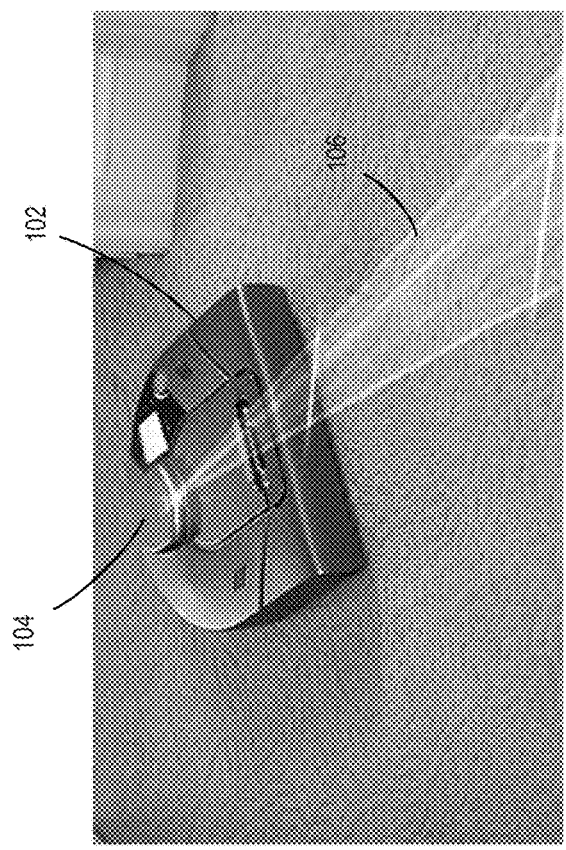
FIG. 1 is a diagram of a cleaning robot with a LIDAR turret according to an embodiment.

FIG. 1 is a diagram of a cleaning robot with a LIDAR turret according to an embodiment. A cleaning robot 102 has a LIDAR (Light Detection and Ranging) turret 104 which emits a rotating laser beam 106. Detected reflections of the laser beam off objects are used to calculate both the distance to objects and the location of the cleaning robot. One embodiment of the distance calculation is set forth in U.S. Pat. No. 8,996,172, "Distance sensor system and method," the disclosure of which is incorporated herein by reference. Alternately, VSLAM (Visual SLAM using image sensors) or other localization methods can be used. The collected data is also used to create a map, using a SLAM (Simultaneous Location and Mapping) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
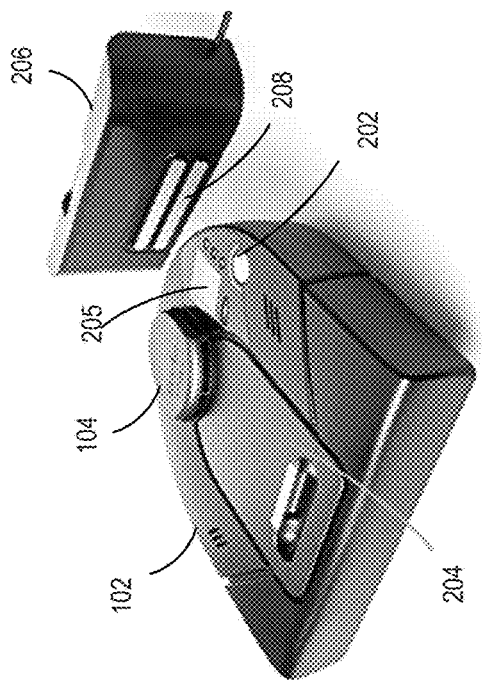
FIG. 2 is a diagram of a cleaning robot and charging station according to an embodiment.

FIG. 2 is a diagram of a cleaning robot and charging station according to an embodiment. Cleaning robot 102 with turret 104 is shown. Also shown is a cover 204 which can be opened to access a dirt collection bag and the top side of a brush. Buttons 202 allow basic operations of the robot cleaner, such as starting a cleaning operation. A display 205 provides information to the user. Cleaning robot 102 can dock with a charging station 206, and receive electricity through charging contacts 208.

Figure 3:
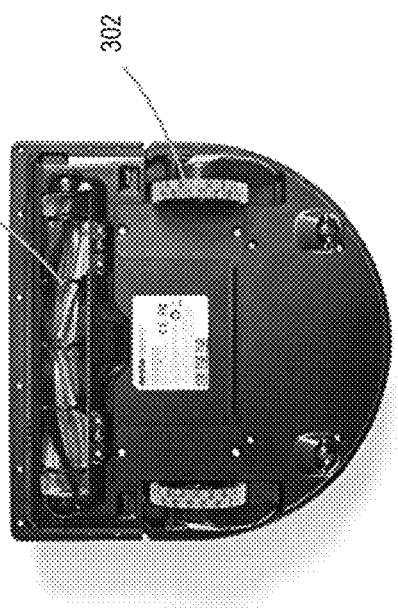
FIG. 3 is a diagram of the underside of a cleaning robot according to an embodiment.

FIG. 3 is a diagram of the underside of a cleaning robot according to an embodiment. Wheels 302 move the cleaning robot, and a brush 304 helps free dirt to be vacuumed into the dirt bag.

Figure 4:
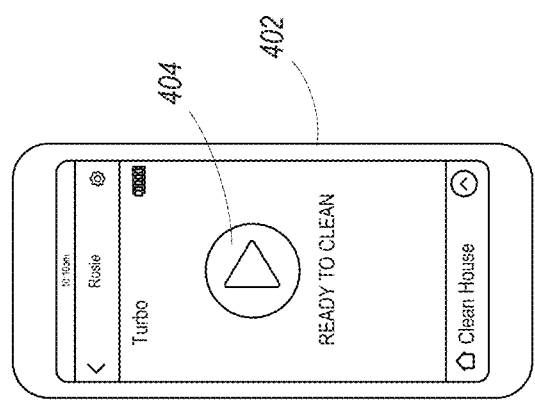
FIG. 4 is a diagram of a smartphone control application display for a cleaning robot according to an embodiment.

FIG. 4 is a diagram of a smartphone control application display for a cleaning robot according to an embodiment. A smartphone 402 has an application that is downloaded to control the cleaning robot. An easy to use interface has a start button 404 to initiate cleaning.

Figure 5:
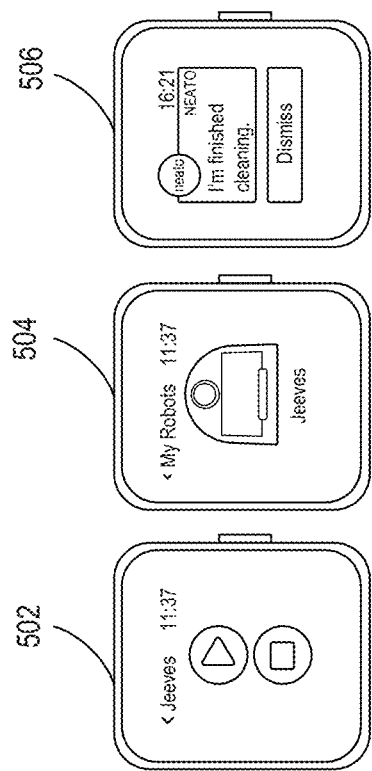
FIG. 5 is a diagram of a smart watch control application display for a cleaning robot according to an embodiment.

FIG. 5 is a diagram of a smart watch control application display for a cleaning robot according to an embodiment. Example displays are shown. A display 502 provides and easy to use start button. A display 504 provides the ability to control multiple cleaning robots. A display 506 provides feedback to the user, such as a message that the cleaning robot has finished.

Figure 6:
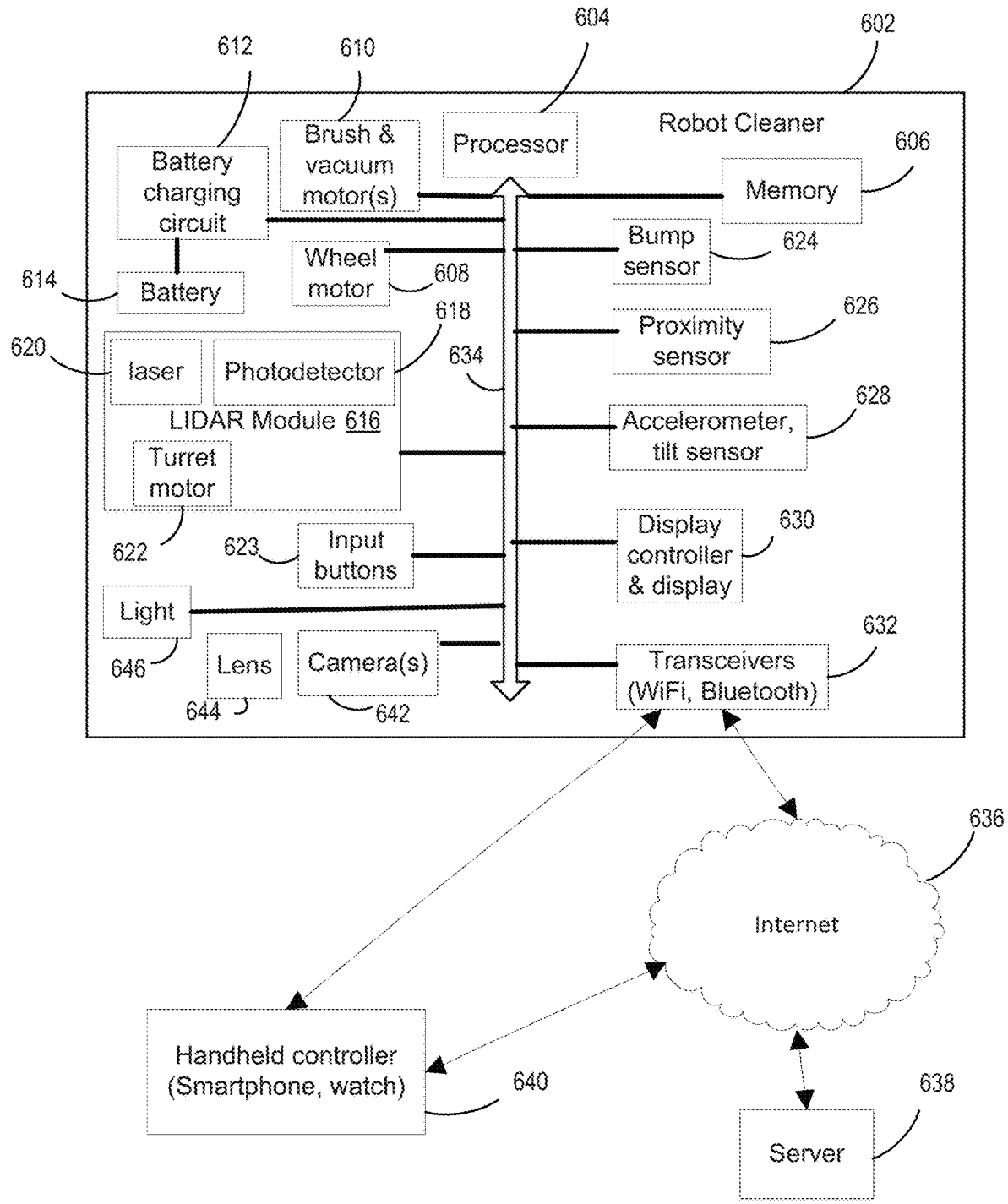
FIG. 6 is a diagram of a the electronic system for a cleaning robot according to an embodiment.

FIG. 6 is a high level diagram of a the electronic system for a cleaning robot according to an embodiment. A cleaning robot 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the floor, and can be operated in different modes, such as a higher power intensive cleaning mode or a normal power mode.

LIDAR module 616 includes a laser 620 and a detector 616. Alternately, an image sensor can be used with a VSLAM operation. A turret motor 622 moves the laser and detector to detect objects up to 360 degrees around the cleaning robot. There are multiple rotations per second, such as about 5 rotations per second. Various sensors provide inputs to processor 604, such as a bump sensor 624 indicating contact with an object, proximity sensor 626 indicating closeness to an object, and accelerometer and tilt sensors 628, which indicate a drop-off (e.g., stairs) or a tilting of the cleaning robot (e.g., upon climbing over an obstacle). Examples of the usage of such sensors for navigation and other controls of the cleaning robot are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a floor sensor for detecting the type of floor, and an image sensor (camera) for providing images of the environment and objects.

A battery 614 provides power to the rest of the electronics though power connections (not shown). A battery charging circuit 612 provides charging current to battery 614 when the cleaning robot is docked with charging station 206 of FIG. 2. Input buttons 623 allow control of robot cleaner 602 directly, in conjunction with a display 630. Alternately, cleaning robot 602 may be controlled remotely, and send data to remote locations, through transceivers 632.

A camera 642, or multiple cameras, are connected to bus 634. A lens 644 is placed in front of the camera. A light 646 can be provided to illuminate the field of view of the camera. The images may be stored in memory 606, and/or uploaded to the cloud through a wireless or wired connection and the Internet.

Through the Internet 636, and/or other network(s), the cleaning robot can be controlled, and can send information back to a remote user. A remote server 638 can provide commands, and can process data uploaded from the cleaning robot. A handheld smartphone or watch 640 can be operated by a user to send commands either directly to cleaning robot 602 (through Bluetooth, direct RF, a WiFi LAN, etc.) or can send commands through a connection to the internet 636. The commands could be sent to server 638 for further processing, then forwarded in modified form to cleaning robot 602 over the internet 636.

Computer Systems for Media Platform and Client System

Figure 7:
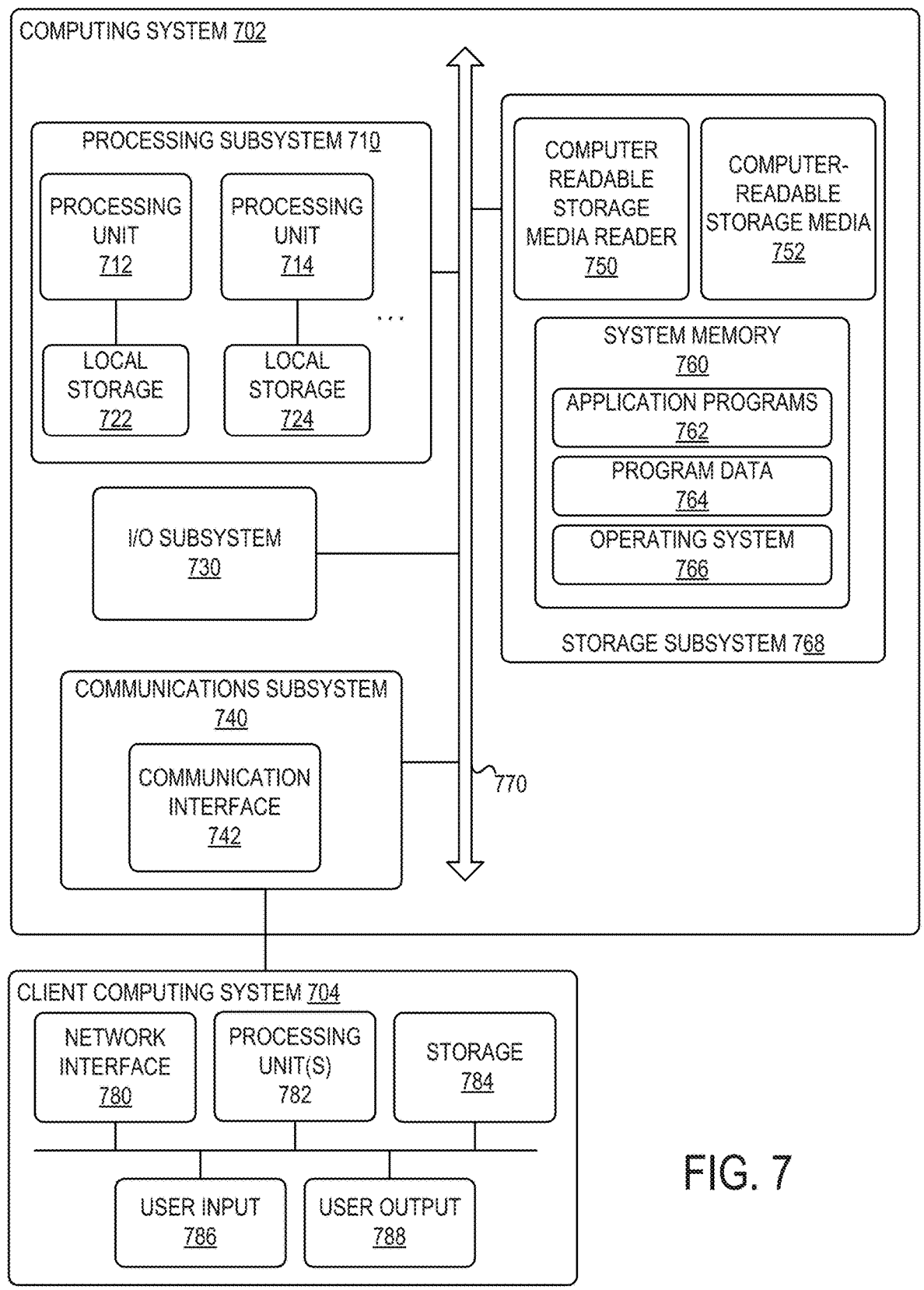
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the cleaning robot processor system, remote server, or any other computing system described herein or portions thereof. Client computing system 704 or similar systems may implement user devices such as a smartphone or watch with a robot cleaner application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended.

Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Photomosaic Floor Mapping

Figure 8:
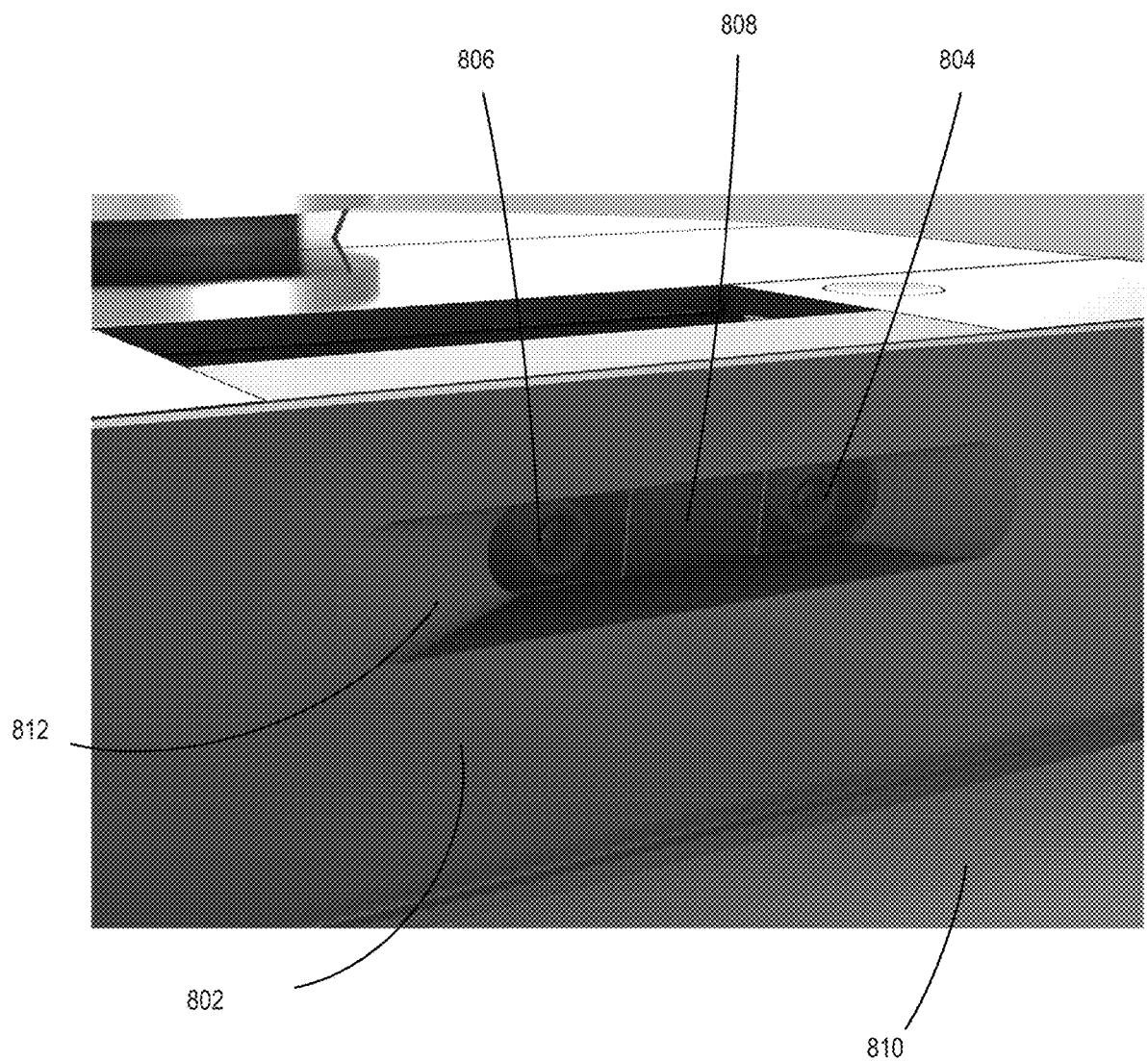
FIG. 8 is a diagram of a camera imbedded in a cleaning robot housing according to an embodiment.

FIG. 8 is a diagram of a camera imbedded in a cleaning robot housing according to an embodiment. One embodiment uses a single camera 804 in the front housing 802 of a cleaning robot. An alternate embodiment adds a second camera 806. As shown, both cameras are mounted in a recess 812 in the front of housing 802. Cameras 804, 806 are mounted to point slightly downward toward a floor 810. In one embodiment, a light 808 is mounted between the cameras to provide illumination for the field of view of the cameras.

Figure 9:
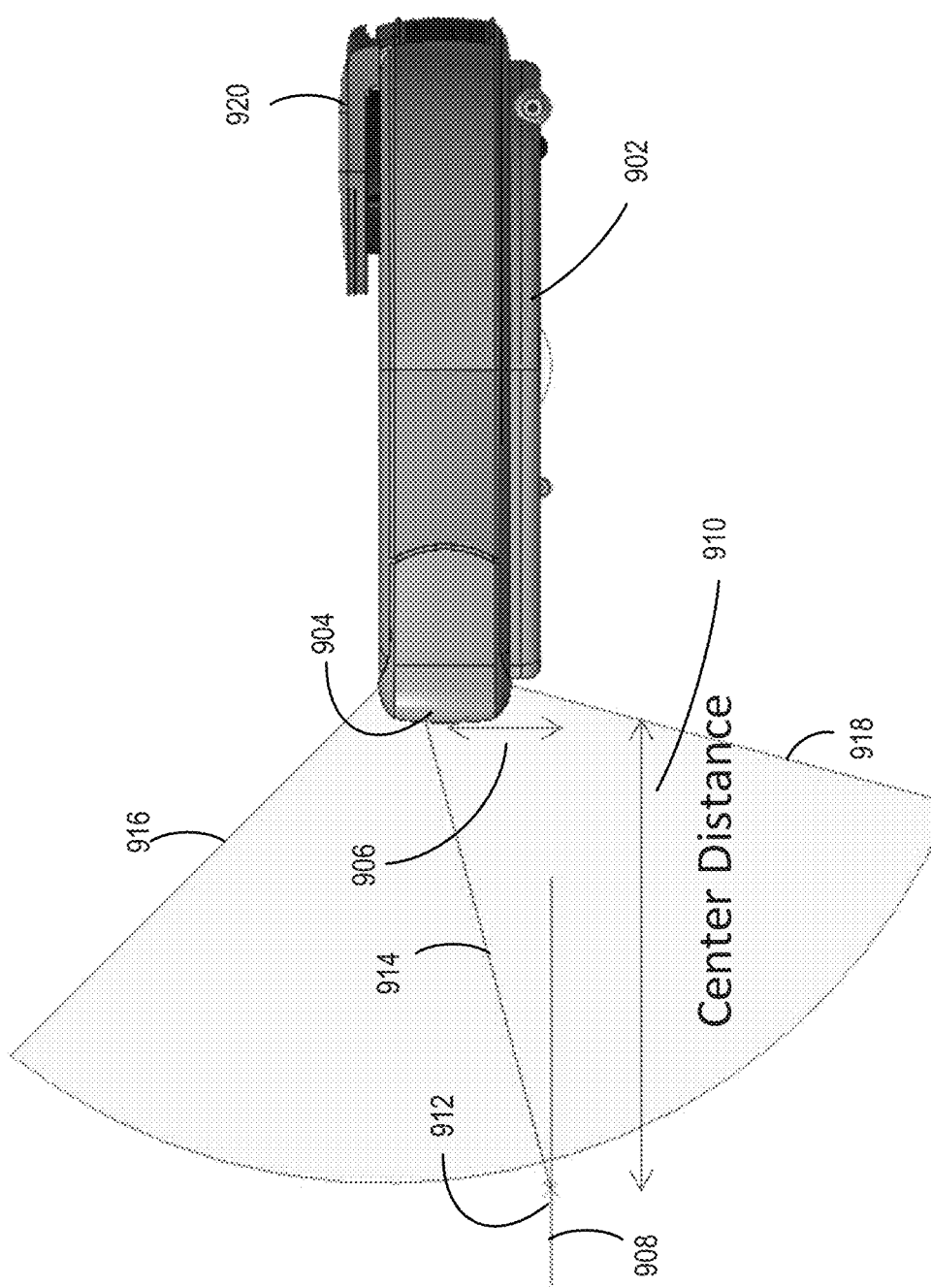
FIG. 9 is a diagram of cleaning robot with a camera illustrating the calculated planar position of a point in the camera's image according to an embodiment.

FIG. 9 is a diagram of cleaning robot with a camera illustrating the calculated planar position of a point in the camera's image according to an embodiment. Cleaning robot 902 has a camera 904 mounted in the front. The camera has a field of view, illustrated by the area between upward line 916 and downward line 918. The camera is mounted a known distance 906 off a floor or other supporting surface 908. For any particular pixel in an image in the camera's field of view, the planar position can be calculated from the position and the camera height 906. For example, point 912 is viewed by the camera at a pixel position illustrated by where a line 914 contacts the camera. This pixel in the image can then be associated with a position corresponding to a center distance 910, from the camera to point 912 on floor 908.

The location of the robot 902 is known from a LIDAR module 920. Thus, knowing the offset distance between the detector in LIDAR module 920 and camera 904, an offset is determined. The location of point 912 is thus the LIDAR determined coordinates of the robot cleaner 902, plus the offset, plus the center distance 910. Note that alternately other location mechanisms can be used, such as VSLAM, indoor GPS, wheel odometers, or any combination. The location calculation would be modified accordingly. For example, for VSLAM, the offset would be the distance between camera 904 and the VSLAM camera. If the same camera 904 is used for both functions, the offset can be eliminated.

Alternate methods could also be used to determine the planar location of a pixel in the camera image. For example, objects, such as walls or appliances, could be detected in the image, and there location may be known from prior contact by a bump sensor on the robot cleaner. From that known position, and the known position of the robot cleaner, the position of pixels in the image can be calculated.

Any tilting of the robot is detected and used to correct to image pixel position or simply discard the image. The tilting can be detected by a tilt sensor, accelerometer, or analysis of the image data. For example, the movement vertically of a known spot in an image, more than would result from translational movement of the robot, can be used as an indication of tilt.

To provide a sufficient field of view, a fish eye or other lens may be placed in front of the camera, such as a lens 644 as shown in FIG. 6. In one embodiment, a field of view between 100 and 180 degrees is provided, such as 160 degrees. Alternately, two cameras can be used, as illustrated in FIG. 8, eliminating the need for a lens, or reducing the amount of increased field of view needed from the lens. In one embodiment, the camera is located several centimeters off the floor, such as between 5-20 centimeters, or about 7 centimeters in one embodiment. The camera field of view may begin several centimeters in front of the robot, between 5-25 centimeters in front, and may be 10 centimeters in front in one embodiment. The field of view captured by the camera is larger than the minimum resolution of the eventual planar floor plan, and can be an area between 4×4 mm and 40×60 cm. In one embodiment, the field of view encompasses a rectangular area 20 cm in the direction of the camera's view, and 30 cm in the direction orthogonal to the camera's view. The images captured can be cropped, and the cropped images include one or more tiles, or segments used to make up the map. In one embodiment, the segments or tiles are about 4×4 cm. Alternately, segments can be anywhere from 4×4 mm and 40×60 cm.

In one embodiment, the camera has a resolution at the low end of the HD range. Because the images will be used to populate a floorplan viewable on a smartphone, higher resolution is not needed, saving costs and processing. For example, a 720 p HD camera (1280×720 pixels) would be more than enough resolution.

The number of frames per second also does not need to be high, and can be matched to the accuracy of the localization. For example, if a LIDAR system is used that captures 5 frames/second, a frame rate of 5 frames/second for the camera is more than sufficient. The timing of the image capture can by synchronized with the timing of the localization determination in one embodiment, to insure the image corresponds to the exact location.

Figure 10:
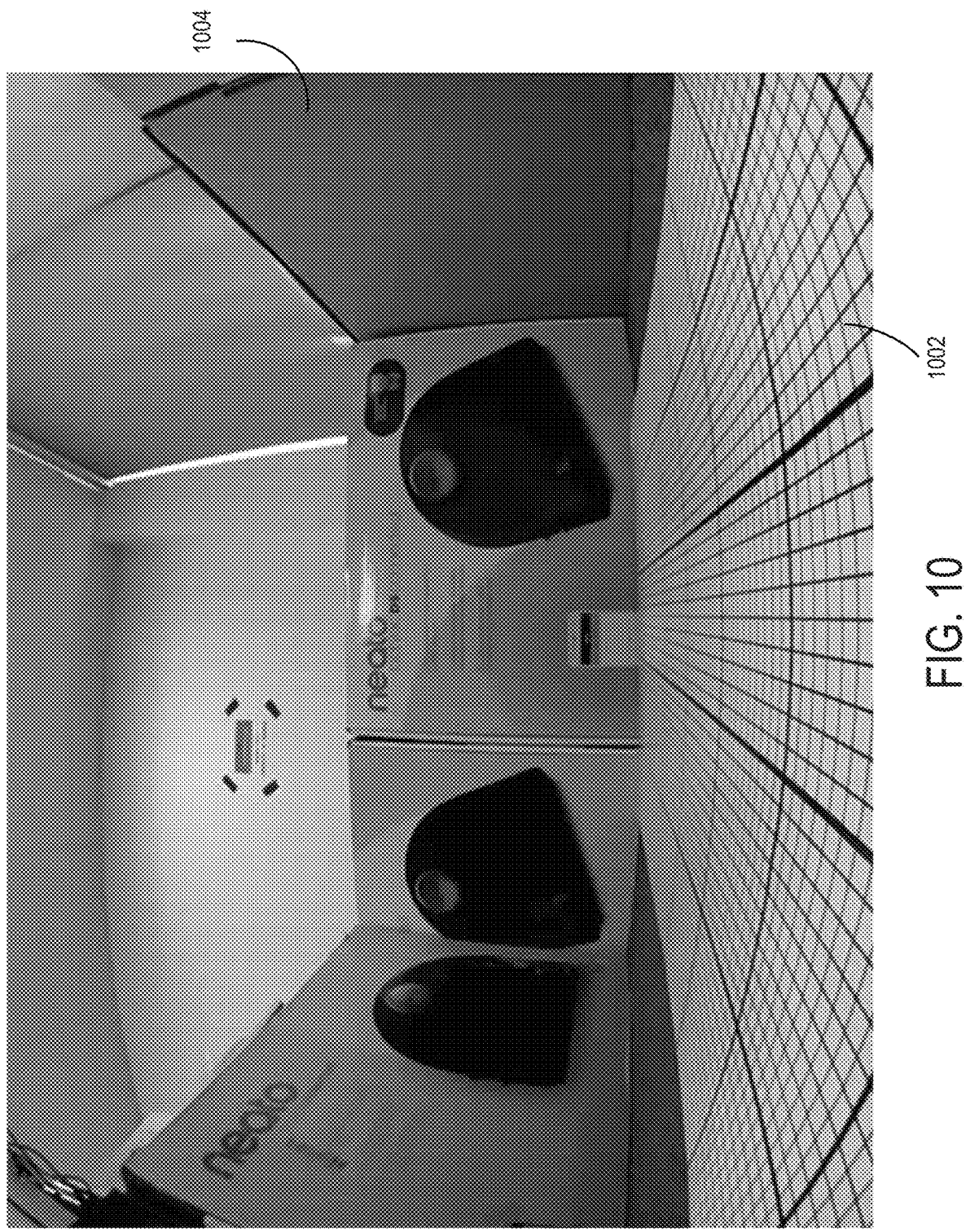
FIG. 10 is a diagram of an image from the camera of a robot as distorted by a fish eye lens according to an embodiment.

FIG. 10 is a diagram of an image from the camera of a robot as distorted by a fish eye lens according to an embodiment. As can be seen, the field of view includes a floor 1002 and a wall 1004, with obvious distortion.

Figure 11:
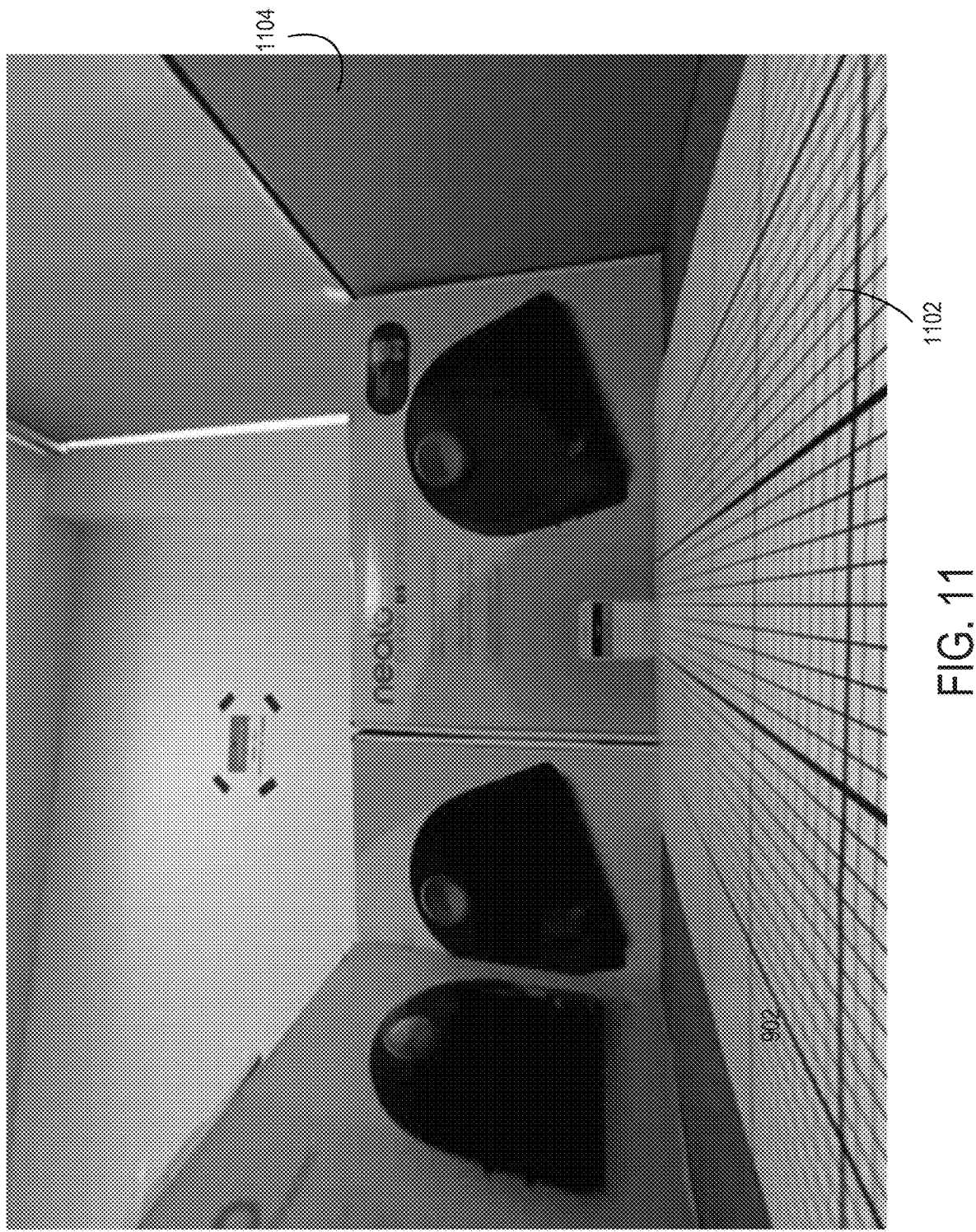
FIG. 11 is a diagram of an image from the camera of a robot after a transformation to correct the distortion by a fish eye lens according to an embodiment.

FIG. 11 is a diagram of an image from the camera of a robot after a transformation to correct the distortion by a fish eye lens according to an embodiment. The image of the floor 1102 has been corrected, as has the wall 1104. In one embodiment, the distortion is corrected using the Open CV (computer vision) warp program.

Figure 12:
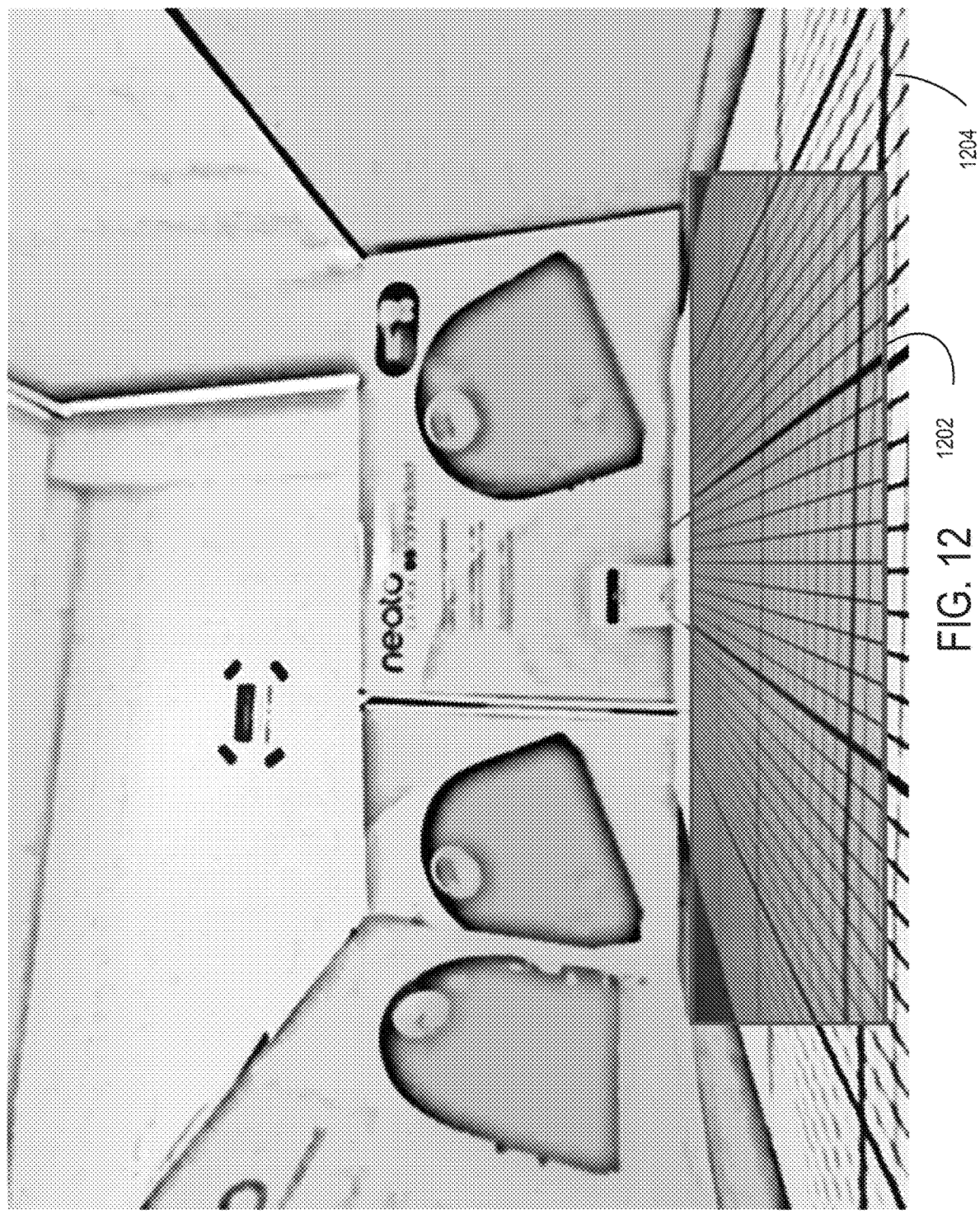
FIG. 12 is a diagram of an image from the camera of a robot showing the clipping of a portion of the floor according to an embodiment.

FIG. 12 is a diagram of an image from the camera of a robot showing the clipping of a portion of the floor according to an embodiment. An area 1202 of the floor area 1204 is cropped for processing. The de-warping can be done before or after the cropping. The cropped image can then be transformed into a planar map coordinates.

Figure 13:
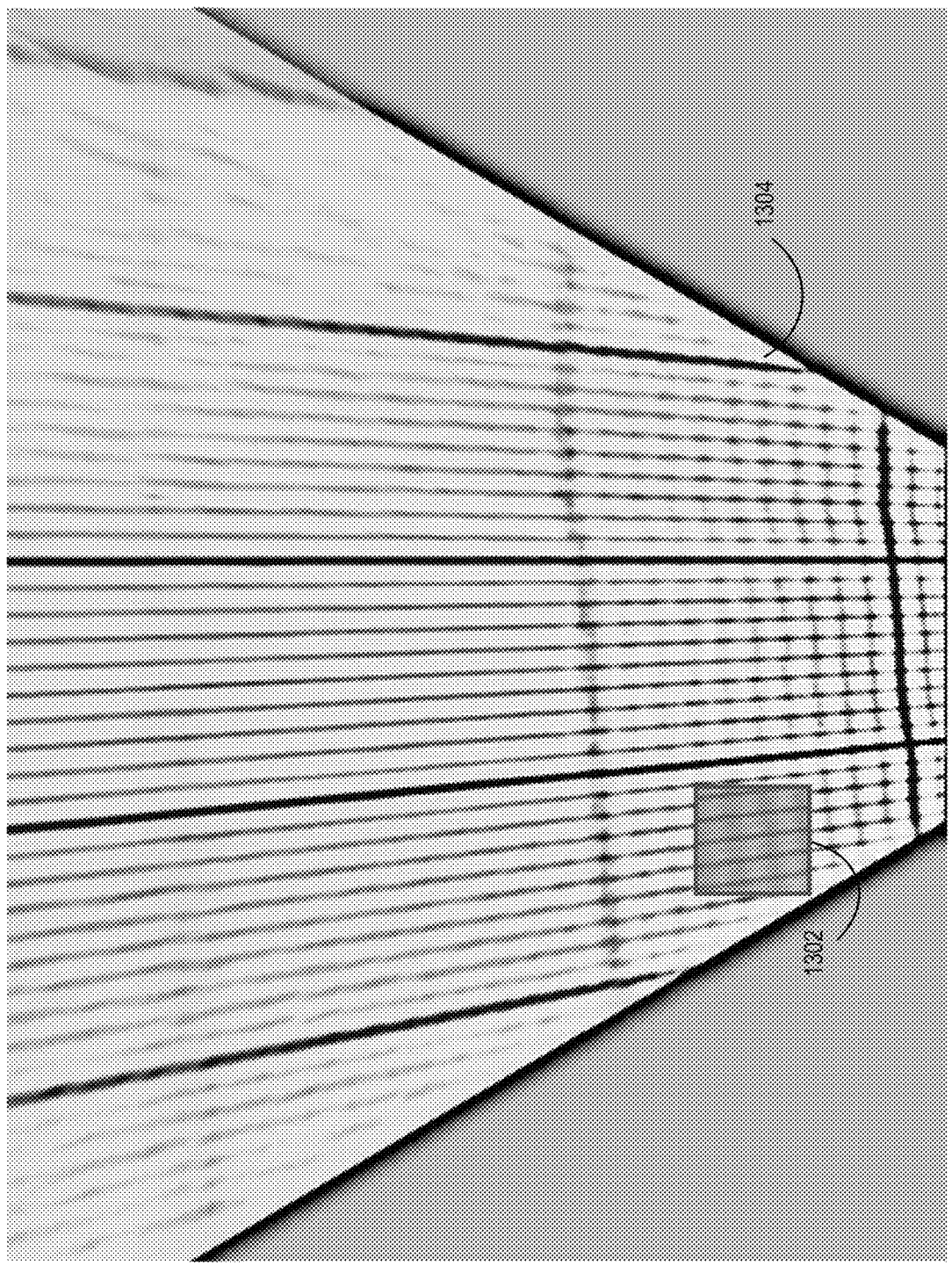
FIG. 13 is a diagram of an image from the camera of a robot converted to planar form and showing a captured segment of the image according to an embodiment.

FIG. 13 is a diagram of an image from the camera of a robot converted to planar form and showing a captured segment of the image according to an embodiment. As can be seen, the image as transformed is a keystone 1304, with the shape changing as it is mapped onto a planar surface from the angled view. A segment/tile 1302 is then captured to provide an image which can be stitched together with other segments/tiles to produce the planar floorplan. In one embodiment, a series of segments/tiles are extracted from each camera image. For example, a row of segments/tiles 1302 can be captured. The segments can overlap, so that the stitching together process can make any needed minor adjustments to the alignment by moving the sub-segments until the overlapping portions match. A second row may be taken from a subsequent image after the robot cleaner has advanced enough that the same row in the image will be the next row on the planar surface, with overlap in the forward direction.

Various other embodiments can be used. A grid of segments may be captured from a single image, and a series of overlapping segments from subsequent images can be obtained. In one embodiment, the primary row of segments captured is sufficiently far from the camera to make the location calculation very accurate, but not too far so that the image clarity is good. Where multiple cameras are used, their field of view overlaps, and that overlap is incorporated into the alignment of the segments. Multiple cameras can also provide redundancy, in the event that the lens of one camera becomes dirty or the images are otherwise blurred, overlapping or subsequent images of the other camera can be weighted with higher quality and used instead.

The image quality can be weighted, with a higher quality image replacing a lower quality one, whether the images re from the same camera or multiple cameras. Weighting factors include, for example, speed of the robot when the image was captured, vibration, angle (tilt), agreement with overlapping portions of other segments, closeness of the segment to the camera and illumination. An image taken at a slower robot speed can have a higher weighting than an image taken at a faster speed. An image taken closer to the robot can have a higher weighting than an image taken farther from the robot. An image taken during a tilt or vibration event can have a lower weighting than an image taken without such tilt or vibration, or with less tilt or vibration. Images taken at higher illumination can be weighted higher, up to a level where too much illumination degrades the quality of the image.

Figure 14:
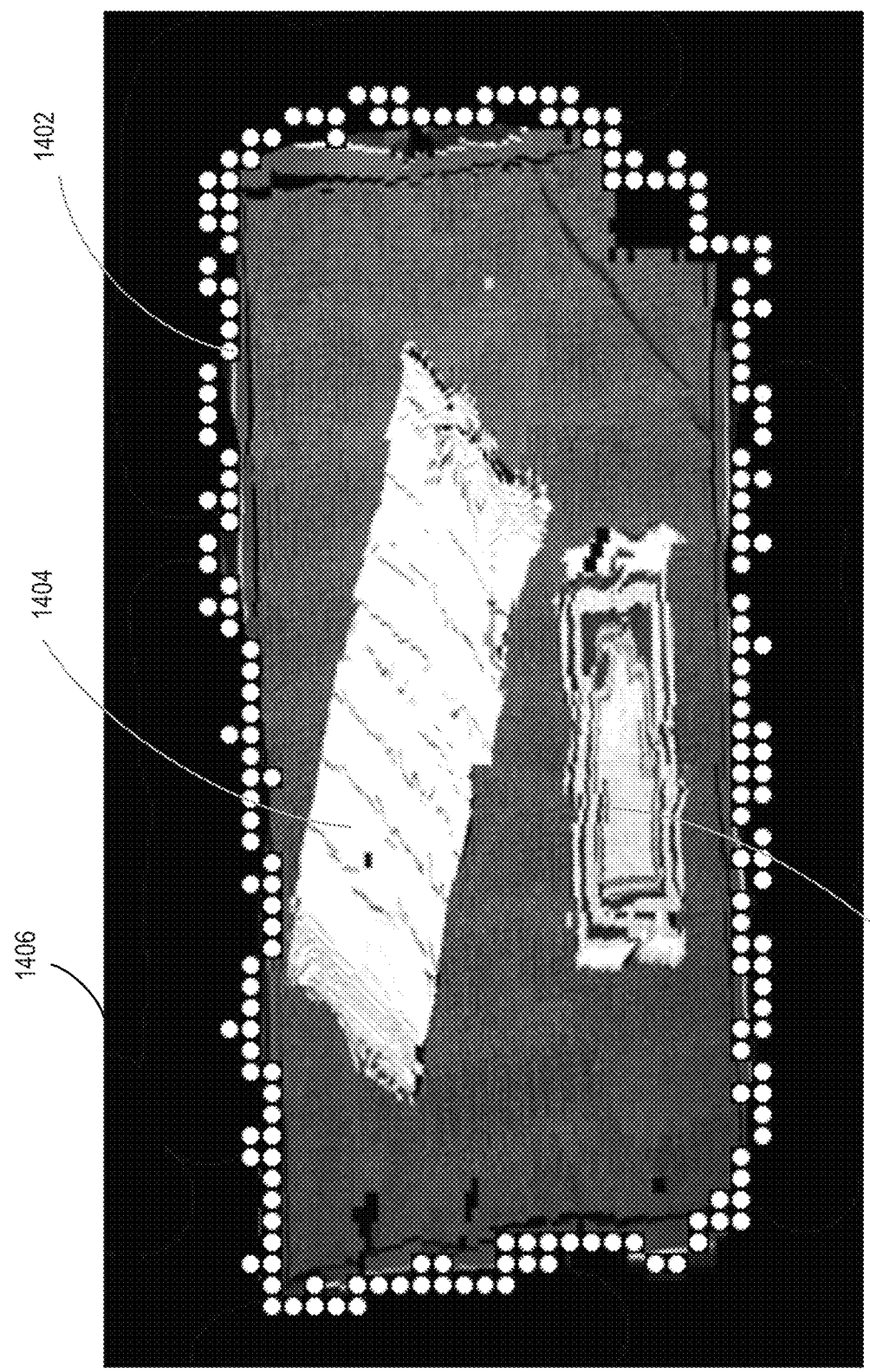
FIG. 14 is a diagram of a user device display showing stitched together segments to form a planar image with objects according to an embodiment.

FIG. 14 is a diagram of a user device display showing stitched together segments to form a planar image with objects according to an embodiment. A display 1406 shows a planar map 1402 of a floorplan mapped by a cleaning robot. The map shows two rugs 1404 and 1406. The maps are sufficiently detailed to show the fringes of the rugs, and thus remind the user that the rugs have fringes.

In one embodiment, a rectilinear grid of the floorplan is first created using localization data. The various rectangles in the grid are then populated using images from the camera. The localization tags associated with the images are used to indicate the appropriate grid location for the image. Adjustments are made using the overlapping areas. The overlapping portion of one of the image segments is then removed.

Figure 15:
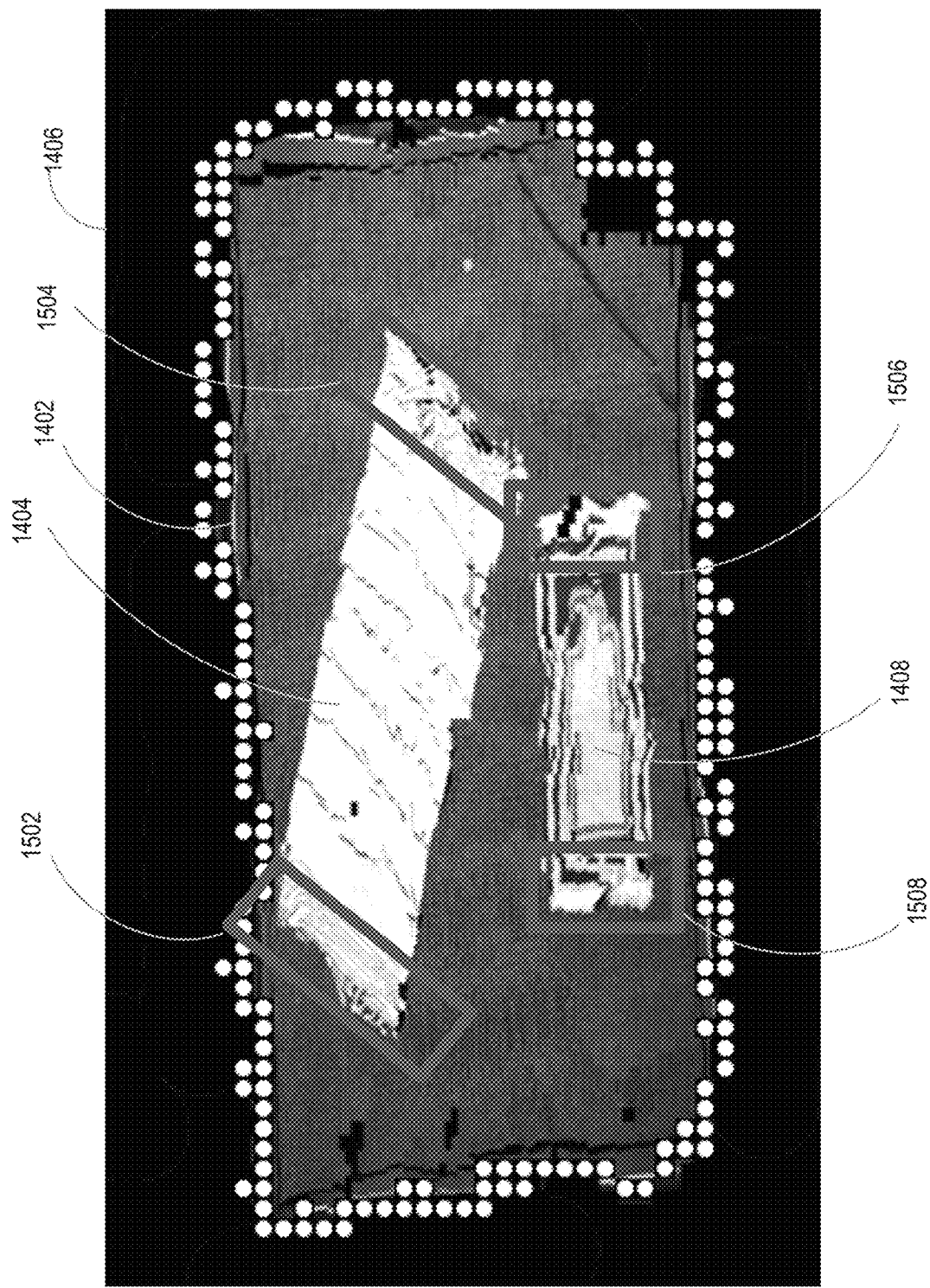
FIG. 15 is a diagram of a user device display showing stitched together segments to form a planar image with no-go portions marked on the display by a user according to an embodiment.

FIG. 15 is a diagram of a user device display showing stitched together segments to form a planar image with no-go portions marked on the display by a user according to an embodiment. The planar floorplan 1402 shows the rugs 1404 and 1408 as in FIG. 14. The user has interacted with the display to draw no-go areas 1502 and 1504 around the fringes of rug 1404, so the robot cleaner does not get its brush snagged on the fringes. No-go areas 1506 and 1508 are indicated on rug 1408. Instead of indicating a no-go area, other modifications of the robot cleaner can be indicated. For example, the robot vacuum can continue over these areas, but the brush could be turned off to avoid entanglement. The figure is just an example of the objects that can be detected. Many other objects can be presented, such as whether the floor is tile or carpeted, small objects or unmapped areas indicating furniture, etc.

Figure 16:
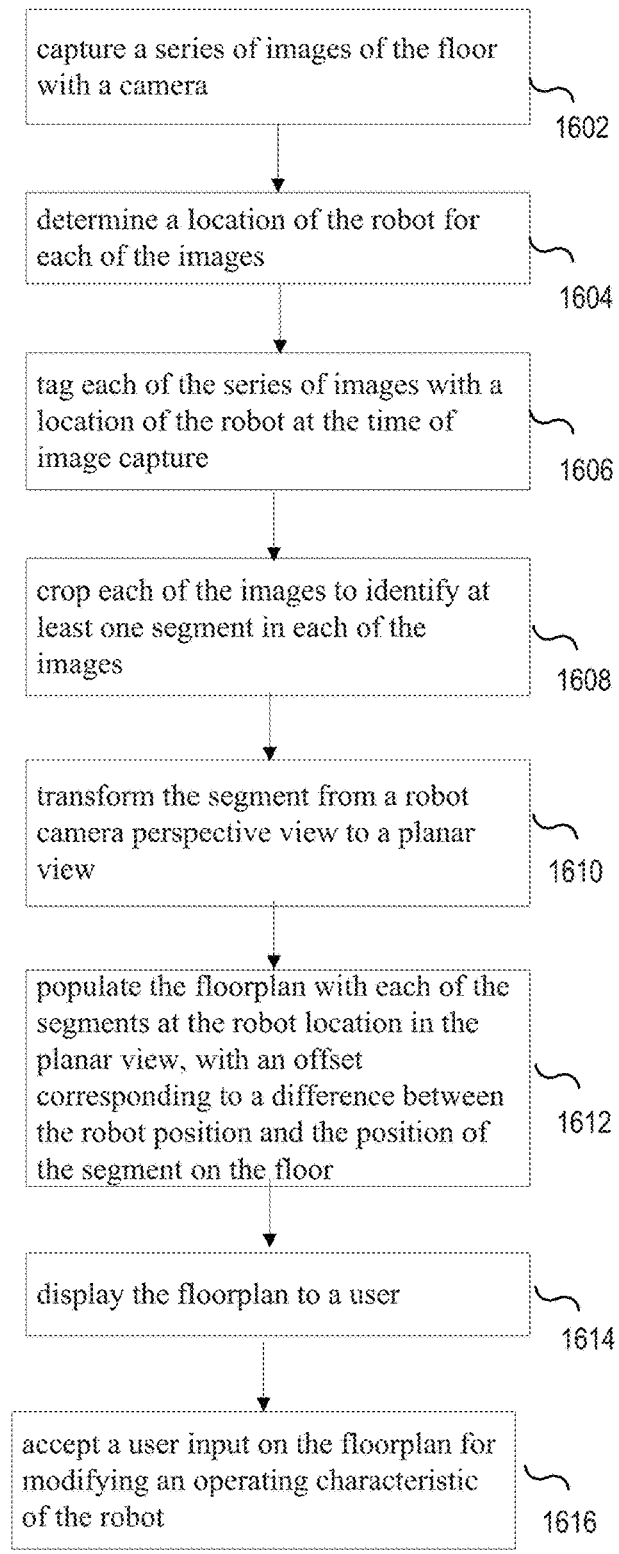
FIG. 16 is a flow chart of the process for generating a planar view floorplan according to an embodiment.

FIG. 16 is a flow chart of the process for generating a planar view floorplan according to an embodiment. The camera first captures a series of images of the floor (step 1602). The location of the robot is determined for each location (1604), such as through LIDAR, VSLAM, GPS or otherwise. A tag is provided for each of the series of images with a location of the robot at the time of image capture (1606). The images are cropped to identify at least one segment in each of the images (1608). A transform of the segment from a robot camera perspective view to a planar view is performed (1610). The floorplan is populated with each of the segments at the robot location in the planar view, with an offset corresponding to a difference between the robot position and the position of the segment on the floor (1612). The floorplan is displayed to a user (1614). A user input is accepted for modifying an operating characteristic of the robot (1616).

Various other embodiments can be used. The camera can be for visible light, infrared light, ultraviolet light, 3D point cloud or other imagery. The images from the camera can be stored and processed locally in the cleaning robot, in a docking station, or remotely at a computer connected to the robot through WiFi, Bluetooth or other wireless connection, or connected to the docking station either wirelessly or through a wired connection. A remote server connected over the Internet or other network can store and/or process images. Image uploading to a docking station processor, remote computer, or server can be done asynchronously after the cleaning robot completes a run, or in real time. The processing can be divided between different processors. For example, one or more of the initial cropping, lens distortion correction and transformation to planar (bird's eye view) format could be done in the cleaning robot, with the stitching together and other operations being done remotely.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for providing a floorplan populated with images captured by a floor-traversing cleaning robot, comprising:
   providing a camera mounted in the floor-traversing cleaning robot sufficiently high in a robot housing to provide an angled view downward at a floor;
   creating localization data using a SLAM algorithm to localize the floor-traversing cleaning robot;
   creating a rectilinear grid of the floorplan using the localization data;
   capturing a series of images of the floor with the camera at different locations as the floor-traversing cleaning robot traverses the floor;
   determining a location of the floor-traversing cleaning robot for each of the images;
   tagging each of the series of images with a location of the floor-traversing cleaning robot at a time of image capture;
   cropping each of the images to identify at least one image segment in each of the images;
   transforming the image segment from a robot camera perspective view to a planar view;
   populating rectangles in the rectilinear grid of the floorplan with each of the image segments at the robot location in the planar view to provide an image populated floorplan, with an offset corresponding to a difference between the robot position and the position of the image segment on the floor, utilizing a known manufactured height of the camera off the floor and known downward angle of the camera to correlate an image pixel position with a planar floor position in the floorplan;
   displaying the image populated floorplan to a user; and
   accepting a user input on the floorplan for modifying an operating characteristic of the floor-traversing cleaning robot;
   wherein the field of view of the camera begins 5-25 centimeters in front of the floor-traversing cleaning robot.

2. The method of claim 1 further comprising:
   providing a lens in front of the robot camera;
   applying a distortion algorithm to the series of images to correct for an image distortion due to the lens.

3. The method of claim 1 further comprising:
   detecting tilting of the floor-traversing cleaning robot beyond a first threshold; and
   correcting the image pixel position or discarding an image.

4. The method of claim 1 further comprising:
   capturing segments for an area that is the same size or larger than a minimum resolution of the floorplan.

5. The method of claim 1, further comprising:
   capturing overlapping segments; and
   adjusting alignment adjustment by matching an overlapping portion of one segment with an overlapping portion of an adjacent segment.

6. The method of claim 1 further comprising:
   providing a source of illumination on the floor-traversing cleaning robot for a field of view of the camera;
   storing a baseline image brightness value for the source of illumination;
   detecting variances in illumination of different segments from a baseline; and
   making any needed corrections in the brightness of the segments due to illumination variances.

7. The system of claim 1 further comprising:
   a LIDAR module mounted in the floor-traversing cleaning robot and configured to determine a location of the floor-traversing cleaning robot using a SLAM algorithm.

8. The method of claim 1 wherein the user input comprises the user indicating at least one of areas where the floor-traversing cleaning robot should not go and areas that require more intensive cleaning.

9. A method for providing a floorplan from images captured by a floor-traversing robot, comprising:
   providing a camera mounted in the floor-traversing robot sufficiently high in a robot housing to provide an angled view downward at a floor;
   capturing a series of images of the floor with the camera at different locations as the floor-traversing robot traverses the floor;
   determining a location of the floor-traversing robot for each of the images;
   tagging each of the series of images with a location of the floor-traversing robot at a time of image capture;
   cropping each of the images to identify at least one segment in each of the images;
   transforming the segment from a robot camera perspective view to a planar view;
   populating the floorplan with each of the segments at the robot location in the planar view, with an offset corresponding to a difference between the robot position and the position of the segment on the floor, utilizing a known manufactured height of the camera off the floor and known downward angle of the camera to correlate an image pixel position with a planar floor position in the floorplan;
   displaying the floorplan to a user;
   accepting a user input on the floorplan for modifying an operating characteristic of the floor-traversing robot;
   capturing the same segment multiple times to provide multiple versions of the same segment;
   determining a weighted quality of each version of the same segment, with the weighed quality including at least one of the speed of the robot when an image was captured, vibration, angle (tilt), agreement with overlapping portions of other segments, and closeness of the segment to the camera and illumination; and
   replacing a lower quality version with a higher quality version.

10. The method of claim 9, wherein the weighted quality is determined using at least one of a speed of the robot when an image was captured, vibration, tilt of the robot, agreement with overlapping portions of other segments, closeness of the segment to the camera and illumination.

11. A method for providing a floorplan populated with images captured by a floor-traversing cleaning robot, comprising:
    providing a camera mounted in the floor-traversing cleaning robot sufficiently high in a robot housing to provide an angled view downward at a floor;
    creating localization data using a SLAM algorithm to localize the floor-traversing cleaning robot;

creating a rectilinear grid of the floorplan using the localization data;
capturing a series of images of the floor with the camera;
providing a lens in front of the robot camera;
applying a distortion algorithm to the series of images to correct for an image distortion due to the lens;
determining a location of the floor-traversing cleaning robot for each of the images;
tagging each of the series of images with the location of the floor-traversing cleaning robot at a time of image capture;
detecting tilting of the cleaning robot beyond a first threshold;
correcting an image pixel position or discarding the image;
cropping each of the images to identify at least one segment in each of the images;
capturing segments for an area that is the same size or larger than a minimum resolution of the floorplan;
transforming the segment from a robot camera perspective view to a planar view;
populating rectangles in the rectilinear grid of the floorplan with each of the segments at the robot location in the planar view to provide an image populated floorplan by utilizing a known manufactured height of the camera off the floor and known downward angle of the camera to correlate an image pixel position with a planar floor position in the floorplan, with an offset corresponding to a difference between the robot position and the position of the segment on the floor;
capturing overlapping segments;
adjusting alignment adjustment by matching an overlapping portion of one segment with an overlapping portion of an adjacent segment;
displaying the image populated floorplan to a user; and
accepting a user input on the floorplan for modifying an operating characteristic of the floor-traversing cleaning robot.

12. A method for providing a floorplan from images captured by a floor-traversing robot, comprising:
providing a camera mounted in the floor-traversing robot sufficiently high in a robot housing to provide an angled view downward at a floor;
capturing a series of images of the floor with the camera at different locations as the floor-traversing robot traverses the floor;
determining a location of the floor-traversing robot for each of the images;
synchronizing a frame rate of image capture with a rate of determining a location of the robot;
tagging each of the series of images with a location of the floor-traversing robot at a time of image capture;
cropping each of the images to identify at least one segment in each of the images;
transforming the segment from a robot camera perspective view to a planar view;
populating the floorplan with each of the segments at the robot location in the planar view, with an offset corresponding to a difference between the robot position and the position of the segment on the floor, utilizing a known manufactured height of the camera off the floor and known downward angle of the camera to correlate an image pixel position with a planar floor position in the floorplan;
displaying the floorplan to a user; and
accepting a user input on the floorplan for modifying an operating characteristic of the floor-traversing robot.

13. A method for providing a floorplan populated with images captured by a floor-traversing cleaning robot, comprising:
providing a camera mounted in the floor-traversing cleaning robot sufficiently high in a robot housing to provide an angled view downward at a floor;
creating localization data using a SLAM algorithm to localize the floor-traversing cleaning robot;
creating a rectilinear grid of the floorplan using the localization data;
capturing a series of images of the floor with the camera at different locations as the floor-traversing cleaning robot traverses the floor;
determining a location of the floor-traversing cleaning robot for each of the images;
tagging each of the series of images with a location of the floor-traversing cleaning robot at a time of image capture;
cropping each of the images to identify at least one image segment in each of the images;
transforming the image segment from a robot camera perspective view to a planar view;
populating rectangles in the rectilinear grid of the floorplan with each of the image segments at the robot location in the planar view to provide an image populated floorplan, with an offset corresponding to a difference between the robot position and the position of the image segment on the floor, utilizing a known manufactured height of the camera off the floor and known downward angle of the camera to correlate an image pixel position with a planar floor position in the floorplan;
displaying the image populated floorplan to a user; and
accepting a user input on the floorplan for modifying an operating characteristic of the floor-traversing cleaning robot;
wherein the resolution of the camera is less than 1280× 720 pixels.

14. A method for providing a floorplan populated with images captured by a floor-traversing cleaning robot, comprising:
providing a camera mounted in the floor-traversing cleaning robot sufficiently high in a robot housing to provide an angled view downward at a floor;
creating localization data using a SLAM algorithm to localize the floor-traversing cleaning robot;
creating a rectilinear grid of the floorplan using the localization data;
capturing a series of images of the floor with the camera at different locations as the floor-traversing cleaning robot traverses the floor;
determining a location of the floor-traversing cleaning robot for each of the images;
tagging each of the series of images with a location of the floor-traversing cleaning robot at a time of image capture;
cropping each of the images to identify at least one image segment in each of the images;
transforming the image segment from a robot camera perspective view to a planar view:
populating rectangles in the rectilinear grid of the floorplan with each of the image segments at the robot location in the planar view to provide an image populated floorplan, with an offset corresponding to a difference between the robot position and the position of the image segment on the floor, utilizing a known manufactured height of the camera off the floor and known downward angle of the camera to correlate an image pixel position with a planar floor position in the floorplan;

displaying the image populated floorplan to a user; and accepting a user input on the floorplan for modifying an operating characteristic of the floor-traversing cleaning robot;

wherein the field of view of the camera is between 100 and 180 degrees and the camera is mounted 5-20 centimeters above the floor.

15. The system of claim 14 further comprising:

a lens mounted in front of the robot camera; and non-transitory, computer-readable code having instructions for applying a distortion algorithm to the series of images to correct for an image distortion due to the lens.

16. The system of claim 14 further comprising:

a tilt sensor mounted in the floor-traversing cleaning robot; and non-transitory, computer-readable code imbedded in computer readable media having instructions for detecting tilting of the floor-traversing cleaning robot beyond a first threshold; and correcting the image pixel position or discarding an image.

17. The system of claim 14 further comprising:

a second camera mounted in the floor-traversing cleaning robot sufficiently high in the robot housing to provide an angled view downward at a floor with a field of view that overlaps with the first-mentioned camera.

18. The system of claim 14 further comprising:

a light mounted in the floor-traversing cleaning robot to provide illumination of a field of view of the camera;

non-transitory, computer-readable code imbedded in computer readable media having instructions for storing a baseline image brightness value for a source of illumination, detecting variances in illumination of different segments from a baseline; and making any needed corrections in the brightness of the segments due to illumination variances.

* * * * *